April 1, 1958 J. STRACKEN 2,828,640
IMPACT ABSORBING MEANS FOR CONVEYOR BELT SUPPORTING ROLLERS
Filed May 3, 1954
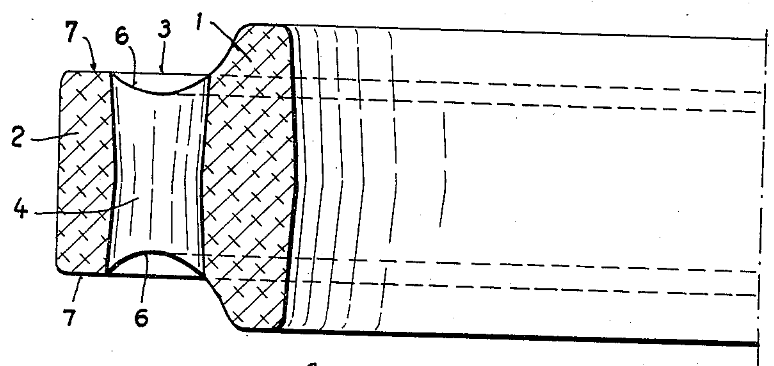
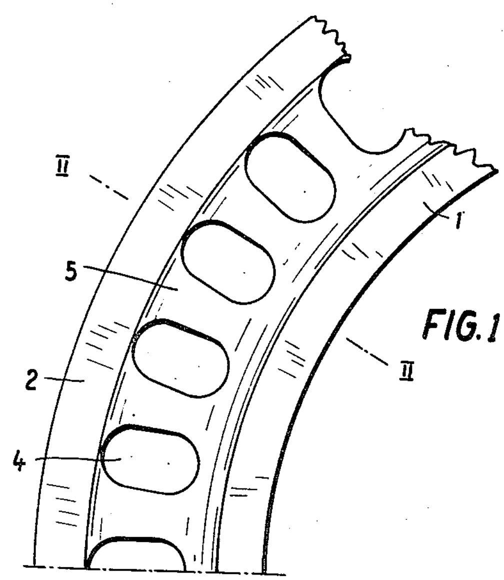
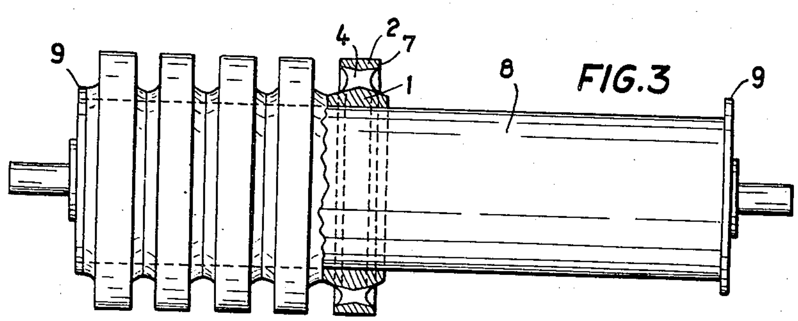
INVENTOR
JOSEF STRACKEN
BY
Bryant & Lowry
ATTYS.

United States Patent Office 2,828,640

Patented Apr. 1, 1958

2,828,640

IMPACT ABSORBING MEANS FOR CONVEYOR BELT SUPPORTING ROLLERS

Josef Stracken, Wahn, near Koln, Germany, assignor to Gustav Witt, Junkersdorf, Koln, Germany Application May 3, 1954, Serial No. 426,995

Claims priority, application Germany May 5, 1953

1 Claim. (Cl. 74—230.7)

This invention relates to impact absorbing means for conveyor belt supporting rollers.

The invention is more particularly concerned with improved impact absorbing and load cushioning means in the form of rings adapted to be positioned on a conveyor roller in side abutting relation from one end of the roller to the other and the peripheries of the rings being adapted to engage the inner surface of a load bearing conveyor belt.

As is generally known, conveyor belts are in many instances subjected to heavy loads and which loads are usually deposited upon the belts from a distance above same with resulting impacts of substantial magnitude.

In other words, conveyor belts are heavily stressed upon charging same with heavy pieces which usually are deposited under the action of gravity and the stresses on the belts are proportional to the charging height as well as the weight of the material to be conveyed.

This problem has long been recognized and many structural expedients have heretofore been proposed or used in an effort to satisfactorily solve such problem.

The solution of such problem would of course immediately suggest the use of some impact absorbing medium between the metal rollers and the belt, such as rubber or the like. The problem has been solved to the extent of providing rubber cushioning mediums between the rollers and the belts but without due regard to the specific disposition of such mediums as would absorb impacts with maximum efficiency and without unduly impairing the life of the cushioning mediums.

Prior attempts to solve such problem have included layers of rubber vulcanized to the outer surfaces of the rollers, and resilient rings surrounding the rollers from end to end thereof.

Such attempts, however, failed to satisfactorily solve the problem due to the fact that insufficient impact absorbing characteristics were provided and the rubber was in many instances impaired by shearing action from the load impacts.

It is accordingly a primary object of this invention to provide load cushioning and impact absorbing means for disposition between a roller and a conveyor belt which has a maximum impact absorbing efficiency as well as a maximum life of service.

A further object of this invention is to provide improved load cushioning and impact absorbing means for conveyor belts which is relatively simple in construction and which is capable of manufacture at relatively low cost.

Other objects and advantages of the invention will become apparent in the course of the following detailed description, taken in connection with the accompanying drawings, wherein:

Fig. 1 is a fragmentary side elevational view of the improved structure in accordance with a preferred embodiment of the invention.

Fig. 2 is a transverse sectional view as observed in the plane of line 2—2 on Fig. 1.

Fig. 3 is a side elevational view of a conveyor roller showing several of the improved rings operatively disposed thereon and with one of the rings shown in diametrical section.

Referring now in detail to the drawings, the invention comprises a ring or annular member of homogeneous resilient material which is preferably rubber.

The annular member comprises an inner hub portion 1, a belt engageable outer portion 2 and an intermediate connecting portion 3.

As is more clearly indicated in Fig. 2, the hub portion 1 is of greater width than the outer belt engageable portion 2. The intermediate portion 3 is provided with a series of circumferentially spaced and transversely extending openings or recesses 4 which provide a plurality of radially extending spokes 5 between the inner hub portion 1 at the outer belt engaging portion 2. The annular member is provided in each of its side walls with a circumferential groove 6 which, as indicated in Fig. 2, extends in part through the inner hub portion 1.

The grooves 6 provide overhanging opposite edges 7 on the outer belt engaging portion 2.

The improved annular members are assembled on a roller 8 in the manner indicated in Fig. 3 wherein it will be seen that the annular members are disposed in transverse encircling relation to the roller from end to end thereof and maintained thereon by suitable means, such as a disk 9 at each end of the roller.

While the relative proportion of the several elements entering into the construction may be varied, they are preferably substantially as shown, it being especially important that the radial dimension of the belt engaging portion be substantially equal to the circumferential dimension of each spoke 5.

The improved structure as shown and as above described has been found to have marked efficiency in absorbing load impacts without impairment to the absorbing medium forming the body of the structure. The improved structure as disclosed is endowed with marked capacity to absorb load impact throughout a major circumferential portion thereof due to the spoke arrangement whereby localized impacts which would be detrimental to the absorbing medium are avoided.

Thus, upon impact centered upon one of the spokes 5, the resilient material will flow and the impact will be transmitted through other spokes circumferentially of the annular member which not only provides a better cushioning action but also avoids damage to the medium in the direct vicinity of the impact. By the provision of the overhanging edge 7, same may readily yield, especially in trough conveyors which is an important consideration in structures of this kind.

Having set forth my invention in accordance with a preferred structural embodiment thereof, what I claim and desire to secure by U. S. Letters Patent, is:

Impact absorbing means for conveyor belt supporting rollers, comprising a unitary annular member of solid homogeneous resilient material, said member including an inner roller-engaging portion, an outer belt-engaging portion of less width and radial height than said inner roller-engaging portion and having parallel opposite side walls and an intermediate portion having opposite concave walls disposed laterally inwardly of said parallel side walls, said concave walls on said intermediate portion being defined by circumferential grooves which extend partially into said inner roller-engaging portion and provide overhanging edge portions on said outer belt-engaging portion, said intermediate portion being provided with a circumferential series of radially elongated openings defining cushioning spokes therebetween, said spokes having circumferential dimensions not greater than corresponding dimensions of said openings, and the outer belt-engaging portion being of a radial height substantially equal to the height of the intermediate portion.

References Cited in the file of this patent

UNITED STATES PATENTS

| | | |
|---|---|---|
| 697,691 | St. John | Apr. 15, 1902 |
| 801,632 | Appleton | Oct. 10, 1905 |
| 1,391,024 | Thebaud | Sept. 20, 1921 |
| 2,546,200 | Snavely | Mar. 27, 1951 |
| 2,596,499 | Mercier | May 13, 1952 |